United States Patent [19]

Stiles et al.

[11] Patent Number: 4,587,182
[45] Date of Patent: May 6, 1986

[54] CONSTANT VOLUME LITHIUM BATTERY CELL AND PROCESS

[75] Inventors: James A. R. Stiles, North Vancouver; Klaus Brandt, Vancouver; David S. Wainwright, Vancouver; Keith C. Lee, Vancouver, all of Canada

[73] Assignee: Moli Energy Limited, Canada

[21] Appl. No.: 680,382

[22] Filed: Dec. 11, 1984

[51] Int. Cl.[4] .............................................. H01M 6/14
[52] U.S. Cl. ......................................... 429/94; 429/50; 429/194; 429/218; 29/623.1
[58] Field of Search ................. 429/218, 66, 194, 224, 429/50, 94; 29/623.1

[56] References Cited

U.S. PATENT DOCUMENTS

| 4,129,686 | 12/1978 | Kaduboski | 429/61 |
| 4,224,390 | 9/1980 | Haering et al. | 429/194 |
| 4,379,815 | 4/1983 | Bubnick | 429/66 |
| 4,384,029 | 5/1983 | Kordesch et al. | 429/224 |

Primary Examiner—Donald L. Walton
Attorney, Agent, or Firm—Lerner, David, Littenberg, Krumholz & Mentlik

[57] ABSTRACT

A battery cell and a method for preparing a battery cell are disclosed in which a substantially fixed volume container includes the cell components therein in voltaic relationship, with the cell components including an anode comprising lithium metal, a non-aqueous electrolyte and a cathode in a spatial relationship to the anode within the fixed volume container, wherein the cathode comprises cathode active material which upon discharge intercalates lithium and undergoes a phase transition to a distinct structural phase in which phase the cathode active material can reversibly operate and which phase provides a cathode expansion greater than the anode volume decrease upon discharge, and wherein the spatial relationship and the cathode expansion within the substantially fixed volume are sufficient to produce a compressive load on the anode which inhibits the formation of a porous deposit of exterior, irregularly oriented, amalgamated lithium grains on the anode when the cell is reversibly operated with the cathode in said phase.

19 Claims, 6 Drawing Figures

CONSTANT VOLUME LITHIUM BATTERY CELL AND PROCESS

BACKGROUND OF THE INVENTION

The present invention relates to a non aqueous, lithium battery cell and to a process for preparing such a battery cell. More particularly, the invention relates to such a battery cell employing the cell components in a substantially constant volume and employing a cathode active material which upon discharge intercalates and undergoes a phase transition to a distinct structural phase, which phase produces a cathode expansion.

U.S. Pat. No. 4,224,390 discloses a non-aqueous, lithium battery cell including as the cathode active material $MoS_2$. In particular, this patent discloses that a secondary lithium battery having good reversible characteristics can be provided by discharging a non-aqueous, lithium/$MoS_2$ battery cell under certain conditions so that certain phase transitions occur within the lithium intercalated $MoS_2$. The patent discloses advantageous phases referred to as "Phase 2" and "Phase 3" and discloses that, when the cathodes of such batteries are operated with the cathodes maintained within these phases, the cathodes provide good reversibility.

Co-pending U.S. application Ser. No. 403,286, filed July 29, 1982, broadly discloses and claims the principle that, by applying a compressive load to a lithium electrode especially during recharging thereof in a non-aqueous battery cell system, it is possible to inhibit the formation of a porous deposit of exterior, irregularly oriented, amalgamated lithium grains on the anode, which grains have been recognized in the art as decreasing the reversibility of the lithium anodes. The compressive load provides a substantially non-porous lithium deposit on the anode, which allows enhanced reversibility for the lithium anode. The prior patent application also discloses the use of $MoS_2$ as a cathode active material in connection with that invention. While this prior application broadly discloses and claims the principle of using a compressive load on the lithium electrode to provide the desired inhibition, the specific embodiments disclosed therein employ mechanical elements separate from the cell components themselves for providing the compressive load, e.g., a spring, C-clamp. etc.

Moreover, X-ray data had been developed during the course of the work in connection with the invention disclosed in U.S. Pat. No. 4,224,390 that indicated that the unit cell volume of the $Li_xMoS_2$ in "Phase 2" as described in U.S. Pat. No. 4,224,390 increased in volume, but less than the decrease in volume of lithium during discharge, i.e., the net change in the volume of the cell from such information would be expected to decrease. Thus, it could not have been expected that cathode expansion with an $MoS_2$ cathode active material could be employed to create a compressive load on the lithium anode, let alone a sufficient compressive load to provide the results as disclosed in application Ser. No. 403,286.

Certain other cathode materials are known to expand upon cell discharge in non-aqueous, lithium batteries. For example, Kaduboski U.S. Pat. No. 4,129,686 discloses that solid cathodes such as $FeS_2$ expand upon discharge. The Kaduboski patent, however, employs such cathode expansion in a lithium primary cell as shown in FIGS. 1 and 2 of the patent in combination with a conductive member 20 having protusions 26 embedded in the anode which will provide a shorting out of the cell when the anode is discharged to a predetermined extent, i.e., the protrusions break through the separator and contact the expanding cathode to short the cell. This is said to avoid distortion of the overall dimensions of the cell. In fact, the Kaduboski patent suggests that in instances where the negative electrode maintains its contour during discharge or for cells that may bulge prematurely, only a portion of the protusions be embedded in the anode (i.e., that a gap be left) so that upon expansion of the cathode, the anode will be forced back against the base of the conductive member.

SUMMARY OF THE INVENTION

It has now surprisingly been found that the inhibition of the formation of a porous deposit of exterior, irregularly oriented, amalgamated lithium grains on the anode, e.g., during charging, can be obtained without the need for separate mechanical means, such as springs, etc., separate from the cell components. More specifically, it has now been found that the geneqral principle disclosed in the co-pending U.S. application Ser. No. 403,286 can be accomplished by a battery cell comprising a substantially fixed volume container containing the cell components therein in voltaic relationship, wherein the cell components include an anode comprising lithium metal, a non-aqueous electrolyte and a cathode in a spatial relationship with the anode within the fixed volume container, wherein the cathode comprises cathode active material which upon discharge intercalates lithium and undergoes a phase transition to a distinct structural phase in which phase the cathode active material can reversibly operate and which phase provides a cathode expansion greater than the anode volume decrease upon discharge, and wherein the spatial relationship and the cathode expansion within the substantially fixed volume are sufficient to produce a compressive load on the anode which inhibits the formation of a porous deposit of exterior, irregularly oriented, amalgamated lithium grains on the anode when the cell is reversibly operated with the cathode in the distinct structural phase. Rather than such a porous deposit, with the invention a substantially non-porous deposit structure is provided which enhances the reversibility of the lithium anode. As explained in U.S. application Ser. No. 403,286, the preferred non-porous lithium metal deposit comprises close packed, lithium grains having columns with the axes aligned substantially perpendicular to the substrate, i.e., the underlying layer of lithium. This type of lithium plating morphology is obtained by pressures of above about 50 psi, preferably from about 50 to about 500 psi. Preferably, the battery cell is pre-conditioned for the desired reversible operation by discharging the cell to provide the desired phase transition along with the expansion of the cathode active material and the compressive load on the anode.

With particular regard to battery cells employing $MoS_2$ as a cathode active material, it has been surprisingly found that, although the unit cell volume of "Phase 2" $MoS_2$ cathode active material intercalated with lithium indicates an insufficient volume expansion even to counterbalance the lithium anode volume decrease, the "Phase 2" $MoS_2$ cathode on a macroscopic level does expand sufficiently upon discharge to more than compensate for the decrease in lithium volume such that the expansion of the $MoS_2$ cathode during discharge within such a fixed volume can maintain a sufficient compressive load on the lithium anode to inhibit the formation of the porous deposit of exterior, irregularly oriented, amalgamated lithium grains on the anode.

The present invention provides significant advantages in that a battery cell can be produced which provides the desired effect of inhibiting the formation of the porous deposit of a exterior, irregularly oriented, amalgamated grains of lithium metal on the anode without the need for any external applied force such as a spring, C-clamp, or swaging, etc. Rather, the compressive load is supplied by the operation of the cell components themselves. All that is needed is that the appropriate cell components be confined in a spatial relationship within a constant volume and allowed to discharge so that a phase transition occurs in the cathode active material such that the volume of the cathode increases to the extent needed to provide the required compressive load on the anode when the cell is cycled (charged and discharged) with the cathode active material in such phase. Thus, the compressive load applied to the anode is greater than the "critical" pressure necessary to achieve the desired plating characteristics for lithium metal on the anode during recharging and subsequent discharging.

Moreover, upon recharging of the battery cell with the cathode maintained in the desired phase, the pressure within the constant volume will increase due to the increase in volume of lithium plated on the anode. This further enhances the inhibition of the porous deposit upon recharging of the cell.

Still further, since it is the characteristics of a cell component, i.e., the cathode active material, which provides the desired result and not any external element, the cathode might be "engineered" to achieve an optimum result, e.g., by creating lattice vacancies or crystal faults in the cathode active material, by doping it or perhaps by thermal treatment such as annealing.

DETAILED DESCRIPTION OF THE INVENTION

Figure 1:
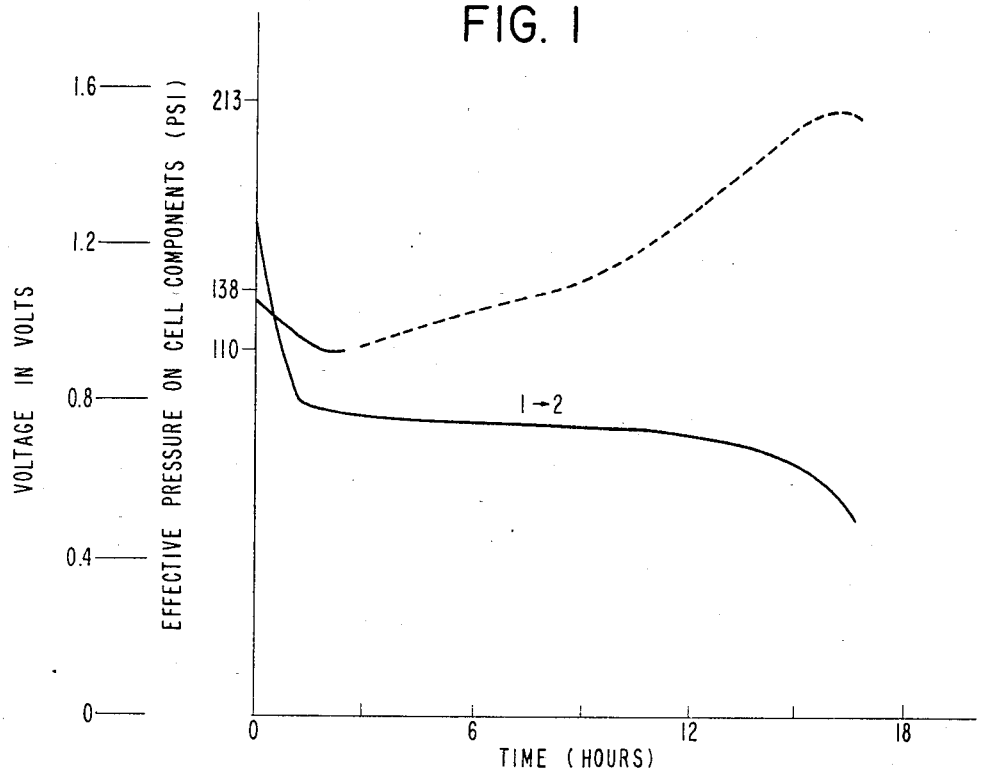
FIGS. 1–5 are graphical representations for a series of five non-aqueous, Li/MoS$_2$ cells showing how the voltage (solid line) and the effective pressure on the cell components (dashed line) change with time as the cell is discharged so that a phase transition occurs from Phase 1 to Phase 2. In each instance, the cell components were contained with in a constant volume in accordance with the present invention, but each had a different initial pressure applied to the cell components.
Figure 2:
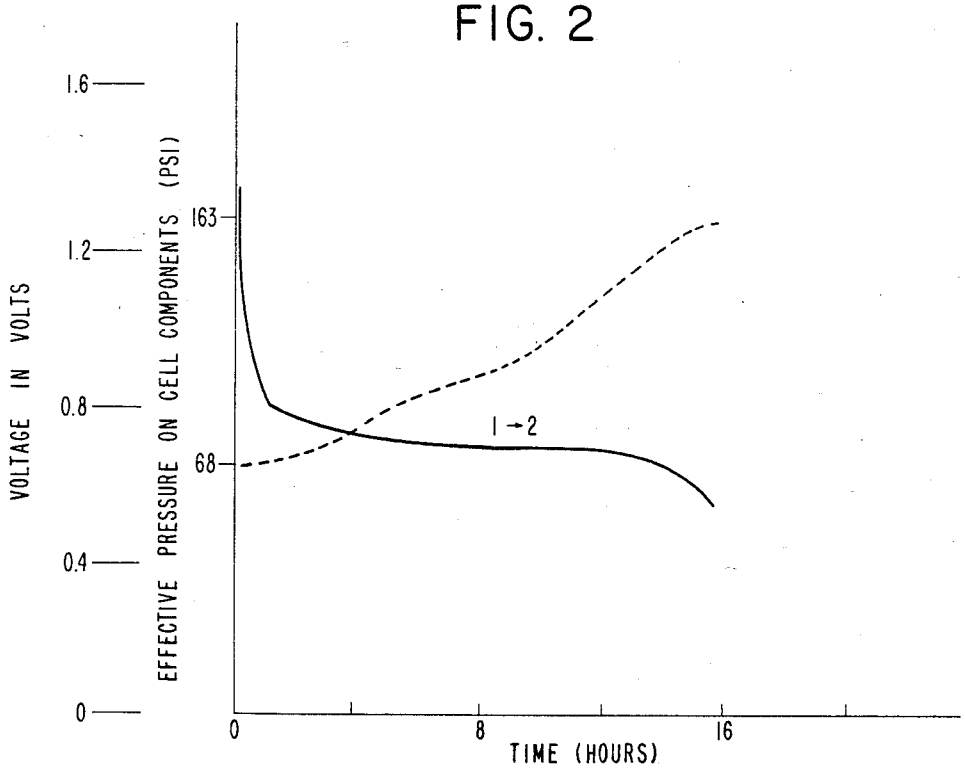
Figure 3:
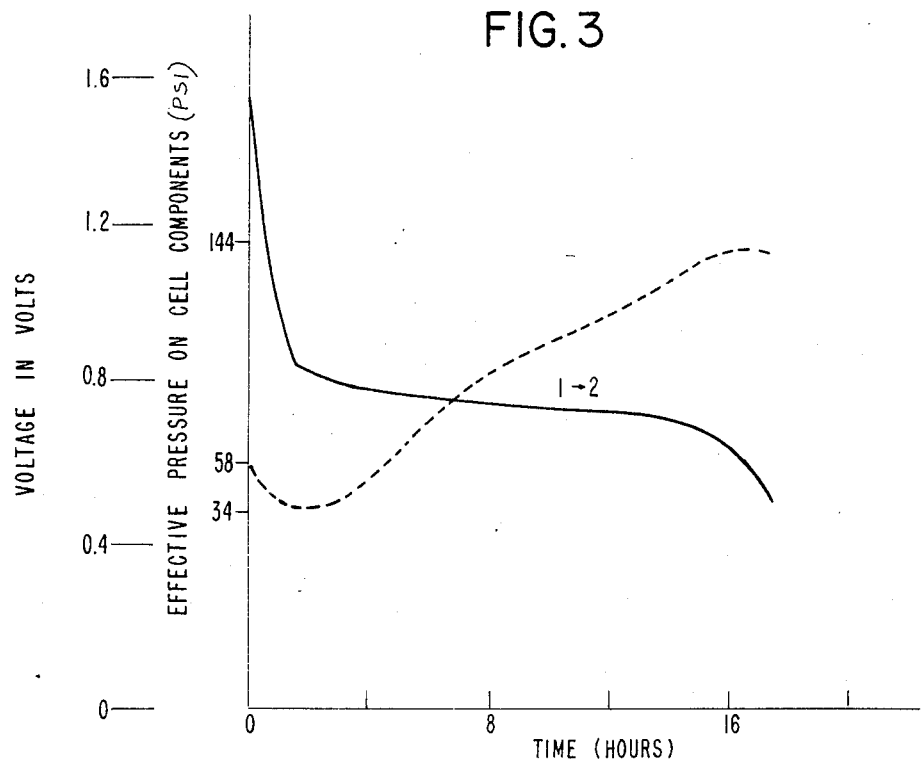
Figure 4:
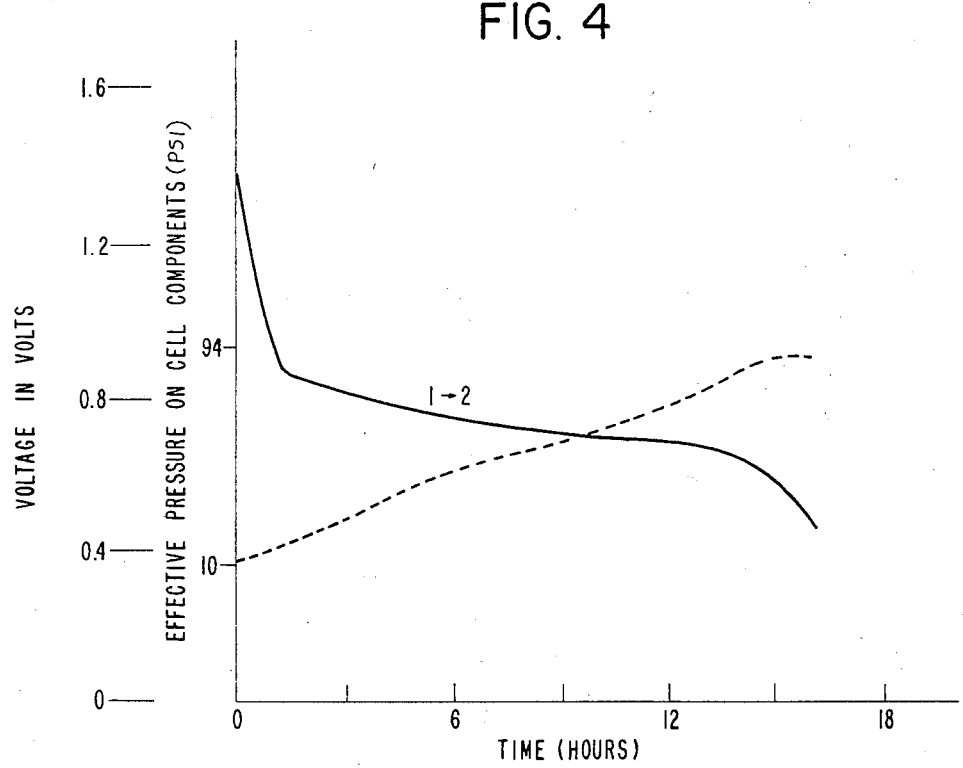

The cathode of the present invention includes a cathode active material which upon discharge intercalates lithium and undergoes a phase transition to a distinct structural phase in which phase the cathode active material can reversibly operate and which phase provides a cathode expansion sufficient to produce with the spatial relationship between the anode and cathode components the desired compressive load on the anode. Suitable cathode active materials include transition metal chalcogenides which have such characteristics. In this regard, a number of transition metal chalcogenides are known to undergo a first order phase transition upon intercalation with lithium. Molybdenum disulfide is a preferred cathode active material, but materials such as tungsten disulfide and molybdenum diselenide may also work. The disclosure of U.S. Pat. No. 4,224,390 is incorporated herein by reference for its disclosure of suitable cathode materials, their preparation and conditioning of such materials to provide phase transitions suitable for use in the present invention.

In a preferred embodiment of the invention, the cathode active material is MoS$_2$. Preferably, the MoS$_2$ is of the crystalline 2H-poly type. In another preferred embodiment of the invention, the cathode active material also contains MoO$_2$ deposited on or coated on the MoS$_2$. In particular, in such embodiment, a portion of the MoS$_2$ material is oxidized to MoO$_2$ so as to form some MoO$_2$ on the surface of the MoS$_2$ material, e.g., 2% to 50% by weight, preferably from about 5 to about 20% by weight. This MoO$_2$ surface treated MoS$_2$ has advantages in the invention as explained in U.S. Pat. No. 4,251,606, the disclosure of which is incorporated herein by reference for purposes of describing such MoO$_2$ surface treated MoS$_2$ and the preparation thereof.

The cathode active material is typically granular or particulate material coated on a substrate. For example, with MoS$_2$ as the cathode active material, the grain size can typically be from about 1 to about 30 microns, preferably about 10 microns in diameter. Any of the conventional binder materials can be used to bind the cathode active particles. Such particles can be employed on a suitable substrate, such as an aluminum substrate as described in U.S. Pat. Nos. 4,224,390 and 4,251,608. Typically, the cathode active grains are present in a thickness of from about 0.5 to about 5 microns, with the total cathode thickness being, for example, from about 0.003 inches (0.08 mm) to about 0.01 inches (0.25 mm). The active material is thus used to coat the substrate at the rate of from about 20 to about 50 mg/cm$^2$, more preferably from about 25 to about 35 mg/cm$^2$ of active material. The cathode active material preferably has a porosity of from about 30 to about 70%. Typically, for a C-cell in a jelly roll structure, cathodes having about 800 cm$^2$ can be employed.

The anode in the present invention comprises lithium metal. In a preferred embodiment, the anode is a lithium foil. However, a lithium alloy could be employed such as lithium/aluminum, lithium/magnesium, or lithium/silicon alloys. The lithium metal could also be included on a non-active substrate. Typically, the lithium anode is included in a battery cell of the invention in a thickness of from about 0.003 inch (0.076 mm) to about 0.02 inch (0.51 mm), more preferably from about 0.005 inch (0.13 mm) to about 0.01 inch (0.25 mm). For a C-cell in a jelly roll structure, anodes having about 400 cm$^2$ on each side can be employed.

The process and battery of the invention can employ any of the non-aqueous electrolytes conventional in the art. For example, propylene carbonate, ethylene carbonate and dimethoxyethane are suitable solvents. In one embodiment, a mixture of propylene carbonate and ethylene carbonate in about a 50/50 mixture are employed.

As the solute, any of the conventional lithium salts used in the art for this purpose can be employed. For example, suitable lithium salts include LiI, LiBr, LiClO$_4$, LiAsF$_6$, LiBF$_4$ and LiAlCl$_4$. Such solutes can be employed in the non-aqueous electrolyte typically in a range of from about 0.1 to about 1.5 molar (or up to the limit of solubility of the salt in the solvent), preferably from about 0.5 to about 1 molar.

A separator is preferably employed between the anode and cathode components of the battery cell. The separator is preferably chemically inert in the battery system, e.g., it will not react with the electrodes or electrolyte and will not dissolve in the electrolyte. The separator should have a uniform pore structure, with the pore size small relative to the cathode particle size which allows the electrolyte to permeate through the separator. A suitable separator material is polypropylene. The separator is suitably a thin sheet, preferably about 0.001 inch (0.025 mm) thick. The separator should be flexible or pliable, especially when used in connection with a jelly roll type structure. The separator in the jelly roll type structure also preferably has a sufficient elasticity so that, when it is wound together in a jelly roll type structure with the anode and cathode materials, the separator can be pulled taut so as to apply an initial compressive load to the electrodes. In such a jelly roll type structure, the separator is also preferably longer than the electrode components so that it overlaps itself and can be heat sealed so as to enclose the electrode elements therein, with the electrical connections being provided by suitable tabs as conventional in the art.

The substantially constant or fixed volume in which the cell components are contained is provided by a container whose walls have a sufficient resilience in the direction which the cathode expands, i.e., the radial direction in a cylindrical container or perpendicular to the electrodes in a button cell, such that when the cathode expands, any expansion in the container is much smaller than the volume change in the cell components so that the desired compression of the lithium anode is obtained. Preferably, there is essentially no expansion of the container. Suitable fixed volume containers include containers made of mild steel or stainless steel either of which could be nickel plated, or for that matter, any other container which will provide the desired fixed volume for cell components.

The battery cell of the present invention can be prepared, for example, as a button cell or as a spiral or jelly roll type cell. In a preferred jelly roll type structure, the cathode, separator and anode are provided in a sequence of cathode (with the cathode active material facing the separator)/separator/anode/separator/cathode (again with the cathode active material facing the separator). These components are wound about a mandrel as is conventional with jelly roll structures. As noted above, the separator is normally greater in length than the anode or cathode.

Figure 5:
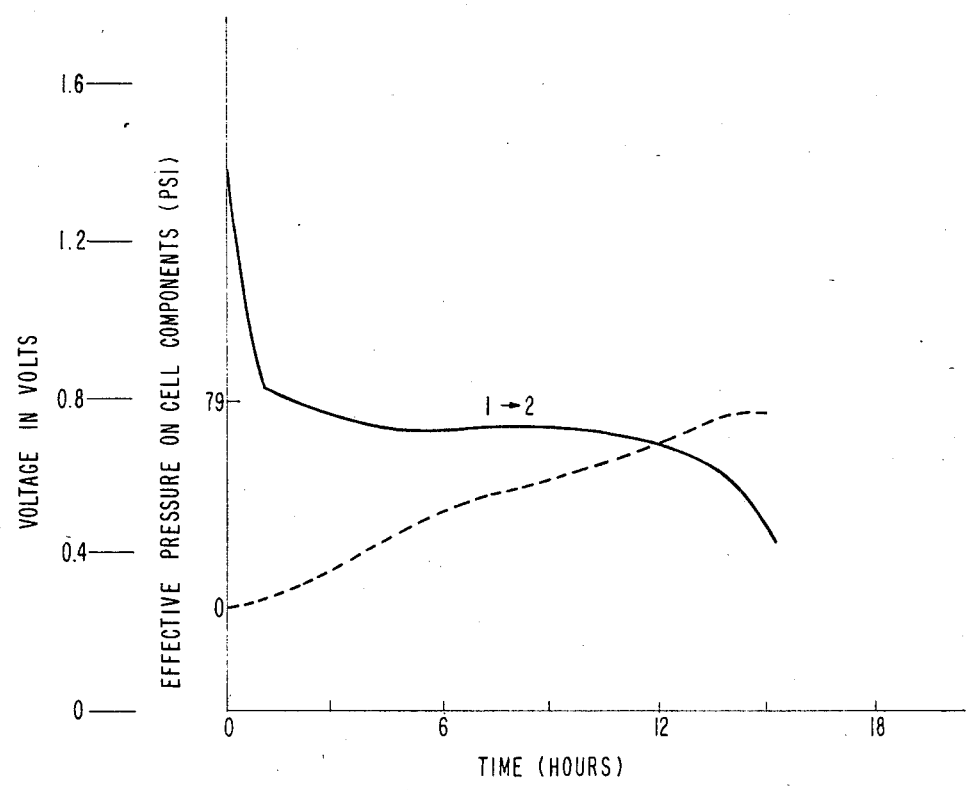

The cell components (typically anode, cathode and separator) are placed in the substantially fixed volume container in a spatial relationship to each other so that, when the cell is discharged and the phase transition and cathode expansion take place, the desired compressive load on the anode is obtained. In one embodiment, prior to the initial discharge to cause the phase transition, at least a portion of the cell components is subject to a compressive load less than the "critical" pressure and the "critical" pressure is generated by discharging the cell components in the confined volume. As indicated by results shown in FIG. 5, when an Li/$MoS_2$ nonaqueous cell with a polypropylene separator are placed in a fixed volume container at about zero initial pressure (i.e., so that essentially no initial pressure is applied to the anode but so that substantially no space is left in the fixed volume to allow expansion of the cell components), a compressive load above the desired "critical" pressure is obtained when the cell is discharged to provide the first order phase transition from "Phase 1" to "Phase 2". However, it is preferred to apply an initial compressive load to the cell components within the substantially fixed volume container. This can be accomplished by use of the cell components themselves without the need for any external force component, e.g., a spring.

For example, with a jelly roll type structure, the cathode and/or separator can be pulled during winding of the cell components about the mandrel so as to provide an initial compressive load on the cell components. The elasticity of a separator material such as polypropylene can be employed to provide the initial compressive load by pulling on the separator as the cell components are being wound. Likewise, a cathode comprising $MoS_2$ on a aluminum foil substrate of thickness 0.0007 inches can be pulled by a force of about 100 to 1000 grams per 2 inches of width as the cell components are being wound about the mandrel. Once the cell components are wound, the extra length of the separator allows it to be heat sealed to itself so that the cell components can be held together about the mandrel to maintain the desired initial compressive load.

The cell components are then placed into the fixed volume container which is shaped so that substantially no space is left therein (with the cell components in place) to allow expansion of the cell components. In other words, the cell components (with or without the initial compressive load) are placed in the substantially fixed volume container so that there is substantially no unused space within the container to allow for expansion of the cell components in the relevant direction, i.e., the radial direction in a jelly roll structure. Thus, the cell components of the jelly roll would be placed in a cylinder having a radius so as not to provide substantially any space for expansion of the cell components radially. While it is preferred that the axial dimensions of the cylinder also provide substantially no space for expansion of the cell components, this is not as critical, since the expansion necessary to provide the compressive load is taking place in the radial direction.

Typically, a top element is then placed on the container and the top is welded shut. A suitable amount of electrolyte is filled into the container through a hole in the top. The hole in the top is then welded shut.

Once the cell components are contained in the fixed volume container in the desired spatial relationship, the cell is discharged until the desired phase transition occurs which provides the cathode expansion and the compressive load on the anode. This discharge is normally conducted at ambient temperatures or below, preferably below 0° C., e.g., −10° C.

In such a phase transition, the structure of the cathode active material changes. This change does not necessarily only have to take place on the molecular or atomic level. For example, as noted above, a definite phase transition takes place between Phase 1 and Phase 2 for lithium intercalated $MoS_2$ at a voltage of from about 0.7 to about 1.1 volts. However, by only looking at the molecular or atomic structural changes, one would not expect that such a phase transition could provide a sufficient volume increase to produce the desired compressive load or "critical" pressure on the lithium anode. Although we do not wish to be bound by any theory, what is believed to happen is that the $MoS_2$ cathode active particles or grains change their macroscopic configuration in the phase transition from Phase 1 to Phase 2, e.g., the particles bend, curl, or cup so as to further increase the volume of the cathode. This increased volume in addition to that expected from the changes in the unit cell volume in the phase transition provides the necessary expansion within the fixed volume container to produce the desired compressive load on the lithium anode.

This change in the mechanical configuration of the cathode particles may also lead to further advantages in the control or optimization of the pressure applied within the constant volume. For example, it may be possible to vary the porosity, the particle size, the particle size distribution, thickness/diameter ratio of the particles, orientation distribution of the particles, and the $MoO_2$ concentration within the particles to provide control of the overall structural changes which take place in the phase transition. Moreover, the change in mechanical configuration is likely to be affected by defect densities in the $MoS_2$ crystals, e.g., lattice vacancies, crystal faults, doping with materials such as Nb, etc. Further, thermal treatment could change the mechanical configuration characteristics of the cathode active particles e.g., by annealing.

With a jelly roll type structure, it is difficult to obtain a uniform initial pressure on the electrodes as the cell components are wound into a spiral. Thus, in general, it is thought that the pressure at the inside of the cell is greater than towards the radially outward portion of the cell. What is believed to occur in a jelly roll type of structure is that during the initial discharge to cause the phase transition, a relatively high current density is obtained about the mandrel where a higher pressure exists. This results in a relatively rapid conversion of the cathode active material in that region and therefore leads to expansion of the jelly roll starting from the center radially outwardly against the boundary of the constant volume container. As the stack pressure increases, hitherto unconverted cathode active material toward the outside of the spiral undergoes the desired phase transition, e.g., from Phase 1 to Phase 2 for $MoS_2$. This hypothesis is supported by the observation that there is an initial sharp drop in voltage of a jelly roll cell in a constant volume situation followed by recovery of the voltage as conversion proceeds with time.

Another significant advantage of the invention employing non-aqueous Li/$MoS_2$ cell components is that the pressure within the substantially fixed volume container generally increases with cycling of the cell with the cathode in "Phase 2". See for example the results illustrated in FIG. 6 which are discussed further below. Similar results would be expected with other cathode active material that expand like $MoS_2$ upon an intercalation phase transition. Thus, the battery cell will not lose its effectiveness for application of the desired compressive load upon repeated use of the battery cell and may even provide better lithium reversibility with cycling.

An initial prototype C cell in a jelly roll structure was prepared using $MoO_2$ surface treated $MoS_2$ (about 30 mg/cm$^2$) on an aluminum substrate as a cathode, a lithium metal foil as an anode, and a polypropylene separator. These components were employed in a sequence of cathode/separator/anode/separator/cathode and wound about a mandrel. The separator and cathode were pulled during the winding and the extra length of separator was heat sealed to itself so as to hold the cell components in the desired cylindrical jelly roll shape. Tabs were used for the necessary electrical contacts. The jelly roll was placed in a tight fitting stainless steel cylinder so that substantially no unused space remained for expansion of the cell components. The top (with a hole for insertion of electrolyte) was welded onto the cylinder, 1 molar $LiAsF_6$ in propylene carbonate was added through the hole, and then the hole was welded shut. The cell was then discharged to a voltage of about 0.6 volts to provide the cathode transition to "Phase 2". The cell could then be readily cycled in "Phase 2" between about 2.4 volts and 1.3 volts.

The following examples are intended to illustrate, but not to limit the scope of the present invention. For example, the invention is illustrated with respect to $MoS_2$ as a cathode active material, but other materials may similarly work.

EXAMPLE 1

A special cell and cell holder were constructed which allow cycling of a cell sandwich under constant height, i.e, constant volume. The constant volume arrangement consists of a pair of flanges with knife edge seals, an electrical feedthrough and a piston that is sealed using a stainless steel bellows. The cell holder consists of a rigid press frame and a spindle, which is used via the piston to constrain the cell height. A load cell is used to measure the force exerted on the cell sandwich. This arrangement allows the measurement of the cell sandwich height with a resolution of about 0.5 $\mu$m and the stack pressure with a resolution of 1 psi.

A series of five cell sandwiches were prepared employing four cathodes and two anodes with separators between the electrodes in the sequence: cathode/separator/anode/separator/cathode/cathode/separator/anode/separator/cathode. Each cathode and anode was 2 centimeters by 2 centimeters in size. The separators were polypropylene. The anodes were lithium foils of 0.005±0.005 inch thickness. The five cathode materials employed in generating the data shown in FIGS. 1-5 contained, respectively, 32.4, 31.0, 32.6, 31.1 and 31.0 mg/cm$^2$ of $MoS_2$ on an aluminum foil substrate. The porosity of the cathode coating was about 50%. Each assembled cell sandwich was confined in the fixed volume of the arrangement and subjected to an initial pressure, e.g., 138 psi, 68 psi, 58 psi, 10 psi and 0 psi for the cells relating to FIGS. 1-5, respectively.

Each of these assembled cell sandwiches were then discharged at a discharge rate of about 0.35 mA/cm$^2$ at about $-10°$ C. Two measurements were taken with respect to time during this discharge, namely, the voltage of the cell and the pressure on the cell components. Plots of voltage vs. time (solid line) and pressure vs. time (dashed line) for the five cells are shown in FIGS. 1-5. Also, the change in cell thickness after discharge was measured for each cell and found to be +0.002 inch (0.051 mm), +0.006 inch (0.15 mm), +0.001 inch (0.025 mm), −0.005 inch (−0.3 mm) and +0.005 inch (1.3 mm), respectively for the cells of FIGS. 1-5.

As can be observed from the plots of voltage vs. time, each of the assembled cells underwent a first order phase transition from "Phase 1" to "Phase 2" as described in U.S. Pat. No. 4,224,390 as is indicated by the flat portion of the curve designated 1→2 in FIGS. 1-5. Moreover, as can be seen from the pressure vs. time plots in these figures, the pressure of the cell sandwich within the constant volume increases during the phase transition in going from "Phase" to "Phase 2". Further, in each instance, the final pressure after the phase transition within the constant volume cell is greater than the "critical" pressure of about 50 psi that is required to provide the inhibition of the formation of the porous deposit of exterior, irregularly oriented, amalgamated lithium metal grains during replating on the lithium anode.

EXAMPLE 2

Figure 6:
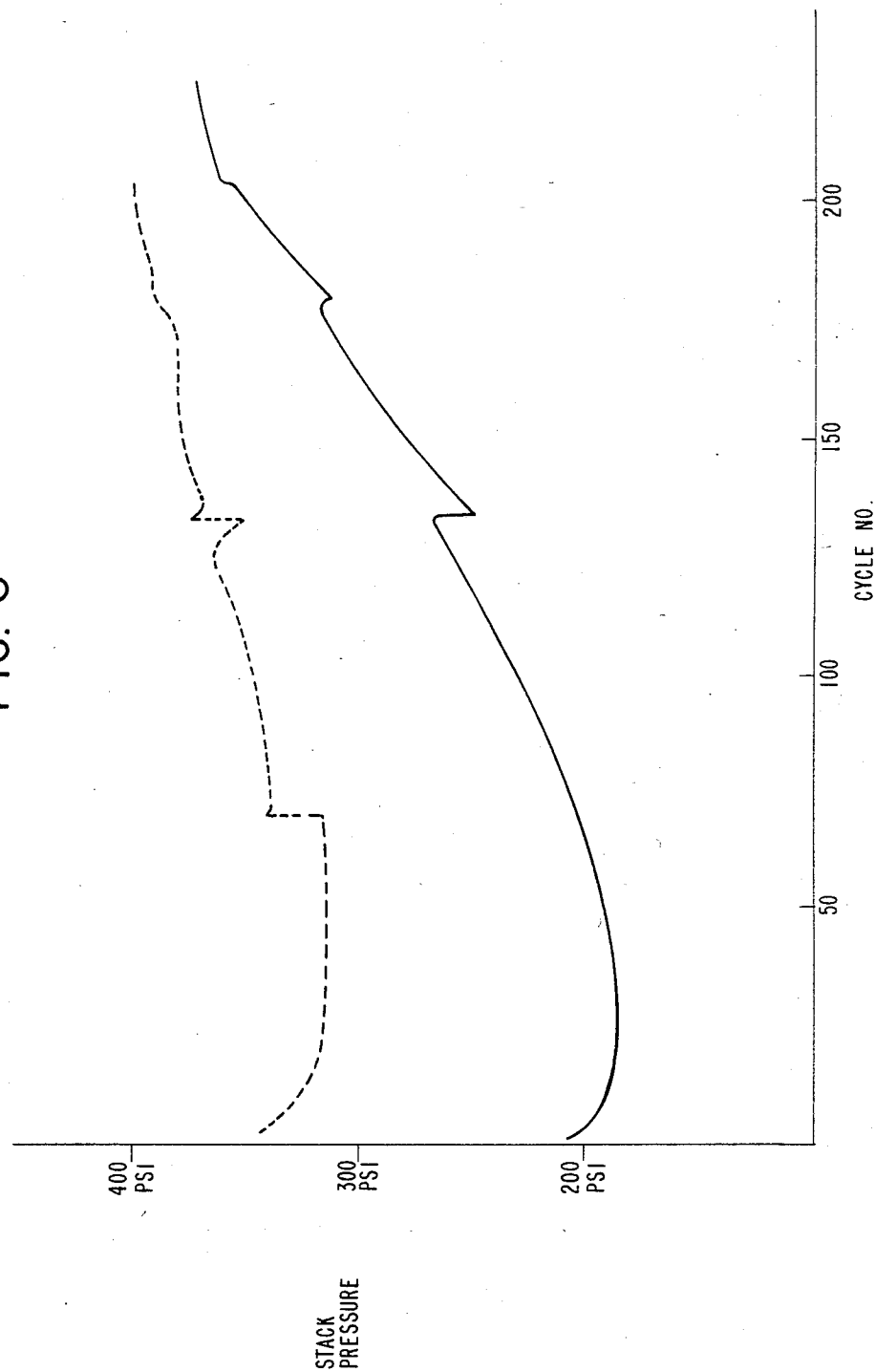
FIG. 6 is a graphical representation showing how the stack pressure varies with cycling of a non-aqueous Li/MoS$_2$ (Phase 2) cell with the cell components contained within a constant volume in accordance with the present invention, the lower line representing the stack pressure at the end of discharge and the upper line representing the stack pressure at the end of recharge.

The arrangement described in Example 1 above was also used to determine how the pressure varied on the same type of cell sandwich (with the cathode conditioned to operate in Phase 2 as in Example 1) when the cell was cycled (charged and discharged) repeatedly between voltages of from about 2.4 to about 1.3 volts. A plot of pressure on such a cell sandwich vs. cycle number is shown in FIG. 6, with the pressure at discharge being shown by the lower plot (solid line) and the pressure at recharge being shown by the upper plot (dashed line) of FIG. 6. The initial pressure on the cell sandwich in the constant volume of the cell was about 210 psi at discharge, i.e., the pressure after the cell was converted to "Phase 2".

As shown in FIG. 6. the stack pressure increases significantly upon recharging of the cell with cathode maintained in Phase 2. Moreover, as the number of cycles for the cell increased, the pressure at the discharge end of the cycle generally becomes higher and higher so that the stack pressures at the end of discharge and at the end of recharge are moving closer and closer together. Thus, the pressure within the constant volume of the cell maintains the desired compressive load on the lithium so that the formation of a porous deposit of exterior, irregularly oriented, amalgamated grains of lithium metal on the anode is inhibited, even after repeated cycling.

It will be understood that the embodiments described above are merely exemplary and that persons skilled in the art may make many variations and modifications without departing from the spirit and scope of the invention. All such modifications and variations are intended to be included within the scope of the invention as defined by the appended claims.

What is claimed is:

1. A battery cell comprising a substantially fixed volume container containing cell components therein in voltaic relationship, said cell components including an anode comprising lithium metal, a non-aqueous electrolyte and a cathode in a spatial relationship to the anode within the fixed volume container, said cathode comprising cathode active material which upon discharge intercalates lithium and undergoes a phase transition to a distinct structural phase in which phase the cathode active material can reversibly operate and which phase provides a cathode expansion greater than the anode volume decrease upon discharge, wherein said spatial relationship and said cathode expansion within said substantially fixed volume are sufficient to produce a compressive load on the anode which inhibits the formation of a porous deposit of exterior, irregularly oriented, amalgamated lithium grains on the anode when the cell is reversibly operated with the cathode in said phase.

2. A battery cell according to claim 1, wherein said cell has been conditioned by discharging said cell to provide said phase transition, said expansion of said cathode active material and said compressive load on said anode.

3. A battery cell according to claim 1 or 2, wherein the cathode active material comprises a transition metal chalcogenide providing such phase transition upon discharge.

4. A battery cell according to claim 1 or 2, wherein the cathode active material comprises $MoS_2$.

5. A battery cell according to claim 2, wherein the cathode active material comprises $MoS_2$ which has been discharged so as to undergo a phase transition to "Phase 2".

6. A battery cell according to claim 4, wherein the cathode active material comprises $MoO_2$ surface treated $MoS_2$.

7. A battery cell according to claim 2, wherein the cathodeactive material comprises $MoO_2$ surface treated $MoS_2$ which has been discharged so as to undergo a phase transition to "Phase 2".

8. A battery cell according to claim 5 or 7, wherein the anode is lithium foil.

9. A battery cell according to claim 8, wherein a separator is disposed between the anode and the cathode.

10. A battery cell according to claim 9, wherein the anode and cathode are wound in a spiral with the separator therebetween.

11. A process for preparing a battery cell, said process comprising the steps of constructing a battery cell of a substantially fixed volume container and cell components within said substantially fixed volume comprising an anode comprising lithium metal, a non-aqueous electrolyte and a cathode comprising cathode active material which upon discharge intercalates lithium and undergoes a phase transition to a distinct structural phase in which phase the cathode active material can reversibly operate and which phase provides a cathode expansion greater than the anode volume decrease upon discharge, said cathode being contained in said substantially fixed volume container in a spatial relationship to the anode such that said spatial relationship and said cathode expansion within said substantially fixed volume are sufficient to produce a compressive load on the anode which inhibits the formation of a porous deposit of exterior, irregularly oriented, amalgamated lithium grains on the anode when the cell is reversibly operated with the cathode in said phase; and discharging the cell to provide said phase transition, said expansion of said cathode active material and said compressive load on said anode.

12. A process according to claim 11, wherein the cathode active material comprises a transition metal chalcogenide providing such phase transition upon discharge.

13. A process according to claim 11, wherein the cathode active material comprises $MoS_2$.

14. A process according to claim 11, wherein the cathode active material comprises $MoS_2$ and said discharge causes the $MoS_2$ to undergo a phase transition to "Phase 2".

15. A process according to claim 11, wherein the cathode active material comprises $MoO_2$ surface treated $MoS_2$.

16. A process according to claim 11, wherein the cathode active material comprises $MoO_2$ surface treated $MoS_2$ and said discharge causes the $MoS_2$ to undergo a phase transition to "Phase 2".

17. A process according to claim 14 or 16, wherein the anode is lithium foil.

18. A process according to claim 17, wherein a separator is disposed between the anode and the cathode.

19. A process according to claim 18, wherein the anode and cathode are wound in a spiral with the separator therebetween.

* * * * *

UNITED STATES PATENT AND TRADEMARK OFFICE
CERTIFICATE OF CORRECTION

PATENT NO. : 4,587,182
DATED : May 6, 1986
INVENTOR(S) : Stiles et al.

It is certified that error appears in the above-identified patent and that said Letters Patent are hereby corrected as shown below:

```
Column 2, line 20, "genearal" should read --general--.
Column 4, line 33, "4,251,608" should read --4,251,606--.
Column 8, line 39, "0.005" (second occurrence) should read
                   --.0005--.
          line 57, "0.3" should read --.13--; "1.3" should
                   read --.13--.
          line 68, "Phase" should read --Phase 1--.
Column 10, line 12, "cathodeactive" should read --cathode
                    active--.
```

Signed and Sealed this

Twenty-third Day of September 1986

[SEAL]

Attest:

DONALD J. QUIGG

Attesting Officer

Commissioner of Patents and Trademarks